(12) United States Patent  
Smith et al.

(10) Patent No.: US 9,415,946 B2
(45) Date of Patent: Aug. 16, 2016

(54) REPLACEABLE BLADE FOR REVERSIBLE BELT SCRAPER

(71) Applicants: Christopher Scott Smith, Huntington, WV (US); Glenn Edward Farrow, Barboursville, WV (US)

(72) Inventors: Christopher Scott Smith, Huntington, WV (US); Glenn Edward Farrow, Barboursville, WV (US)

(73) Assignee: Richwood Industries Inc., Huntington, WV (US)

( * ) Notice: Subject to any disclaimer, the term of this patent is extended or adjusted under 35 U.S.C. 154(b) by 34 days.

(21) Appl. No.: 14/185,869

(22) Filed: Feb. 20, 2014

(65) Prior Publication Data

US 2014/0238822 A1 Aug. 28, 2014

Related U.S. Application Data

(60) Provisional application No. 61/767,946, filed on Feb. 22, 2013.

(51) Int. Cl.
*B65G 45/12* (2006.01)
*B65G 45/14* (2006.01)
*B65G 45/16* (2006.01)

(52) U.S. Cl.
CPC .................................. *B65G 45/12* (2013.01)

(58) Field of Classification Search
None
See application file for complete search history.

(56) References Cited

U.S. PATENT DOCUMENTS

| 5,344,000 A * | 9/1994 | Gleason | B65G 45/16 198/497 |
| 5,628,392 A * | 5/1997 | Stoll | B65G 45/12 15/256.6 |
| 8,757,360 B2 * | 6/2014 | Kuiper | B65G 45/16 198/497 |

* cited by examiner

*Primary Examiner* — Kavel Singh (57) ABSTRACT

A reversible belt scraper has two opposed replaceable scraper blades and a central shaft. Each replaceable scraper blade has a scraping surface and a base opposite to the scraping surface. The body of the scraper blades from the scraping surface to the base is comprised of elastomeric material. The scraper blades have at least one bracket in their bases. In at least one embodiment, the scraper blades have a plurality of brackets in their bases. The brackets in the bases of the scraper blades attach to the central shaft. End mounts at the end of the central shaft provide a means to mount the reversible belt scraper. In at least one embodiment, the brackets in the replaceable scraper blades are formed in a manner to accommodate the other scraper blade and allow both scraper blades to be mounted in a single row of apertures in the central shaft.

17 Claims, 6 Drawing Sheets

REPLACEABLE BLADE FOR REVERSIBLE BELT SCRAPER

CROSS-REFERENCE TO RELATED APPLICATIONS

This application claims priority to U.S. Provisional Application 61/767,946 filed on Feb. 22, 2013. The entirety of U.S. Provisional Application 61/767,946 including both the figures and specification are incorporated herein by reference.

FIELD OF THE INVENTION

This invention relates generally to a replaceable belt scraper blade for a reversible belt scraper apparatus, more specifically this invention relates to a replaceable belt scraper blade having metal inserts allowing it to be easily attached to the belt scraper apparatus and accommodating another replaceable belt scraper blade mounted opposite to it. Belt scrapers within the field of the invention are used on endless conveyer belts carrying mining materials, earth, or other such materials, to scrape away residual material stuck to the belts after the bulk of material that it is carrying has been dumped. This further controls where material is deposited and prevents maintenance problems by preventing stray material from accruing on bearing and other elements of the conveyor belt system.

BACKGROUND OF THE INVENTION

Modern mining techniques make extensive use of endless belts to carry mined material from one location to another. For example, continuous belts may be used to carry mined material out of a mine and deposit it external to the mine. Endless belts may also be employed for carrying materials between processes. These belts can be extremely long and can move the material at high linear speeds. At the end of the belt, or rather where the belt begins its return journey, the belt passes around a wheel or pulley and begins the return journey. At that location, the materials on the belt are deposited. However, it is common for some residual material to adhere to the belt.

To reduce dust problems, particularly in coal mining, the load on the belt is sprayed with water. While this suppresses the dust, it increases the amount of material that adheres to the belt when the load is dumped. This material can transfer to pulleys, rollers, idlers, and bearings and build up. This build up of material causes excessive wear at a minimum and can cause seizing in bearings and may lead to fires, a catastrophic result. Belt scrapers are employed to remove this material from the belts to prevent the transfer to other elements of the conveying system, thereby preventing damage to those elements.

Scrapers are positioned to contact the belt on the terminating wheel or on the return run of the belt to remove this residual material. The dynamic nature of the environment and the abrasive nature of the materials being carried by the endless belt require belt scrapers that are durable and that can be maintained in contact with the belt with consistent pressure. The belt scrapers are expendable elements of the system and any economy that can be achieved with the belt scrapers is an improvement in the economic efficiency of the system. It is therefore highly desirable to have belt scrapers that are durable, that can be used over an extended period of time, and that can be economically manufactured.

Because of the width of the belt, the belt scraping elements that actually contact the belts are frequently divided into subsections so that they are lighter than if they were constructed to span the width of the belt. Although this leads to lighter elements, it requires multiple sections of scraper blades to be installed and this causes an increase in installation time and complications. However, while a single scraper blade that spans the width of the belt avoids the problems of multiple segments, it presents a single heavier unit. In particular, reversible scraper blades having two scraping edges will be heavier still. Since the components of a belt scraping apparatus must be carried and manipulated for installation, it is desirable to have scraping edges that span the width of the belt while limiting the weight that must be carried by personnel.

RELEVANT ART

U.S. Pat. No. 5,628,392 by Stoll et al. is for a "Reversible belt scraper blade for cleaning high speed conveyor belts". A reversible belt scraper is provided with opposite belt scraping surfaces and is adapted to be reversed by inverting. The belt scraper is formed with a pair of metal side frames, and a transversely elongated body is formed as a block of rubber defining the belt scraping surfaces on opposite sides. A pair of fiberboard backing plates are positioned to support the rubber block against forces tending to bend or deflect the rubber. The fiberboard backing plates wear at a rate faster than the wear rate of the rubber block and assure full contact between the belt and the rubber scraping body. In a further embodiment, ceramic bricks are embedded within the rubber block with wear surfaces at the rubber scraping surface. The rubber, brick and backing plates are formed in modular segments which are stacked end-to-end between the frames and retained by metal slugs which extend through the segments.

U.S. Pat. No. 4,696,388 by Stoll is for a conveyor belt scraper blade with contoured surface comprising a conveyor belt scraper blade assembly having an elongate blade body made of a resilient material and having a longitudinally-extending belt scraping surface, a frame attached to the body which imparts a convex shape to the belt scraping surface, and a pair of brackets mounted on the ends of the body for attaching the blade assembly to supporting structure. In a preferred embodiment, the blade body includes a central longitudinal slit and the frame includes an insert having a double convex shape which is fitted within the slit. The frame further includes a pair of opposing side walls which are attached to the insert and include a plurality of inwardly-directed prongs which engage the blade body and hold the body in position relative to the insert.

U.S. Pat. No. 4,402,394 by Stoll is for a "Conveyor Belt Scraper". A conveyor belt scraper is used in combination with a conveyor belt and consists of a primary axle, at least one primary actuator arm attached to and extending from the primary axle, a secondary axle which is preferably concentric with the primary axle and is capable of rotational movement with respect thereto, at least one secondary actuator arm attached to the secondary axle and extending outwardly therefrom, a primary scraper extending from the primary axle which includes a primary blade for engaging a belt, a secondary scraper extending from the secondary axle and including a secondary scraper blade for engaging a belt, an air cylinder attached to and extending between the primary and secondary tension arms, and a mounting bracket for mounting the primary and secondary axles to a support. The air cylinder urges the primary and secondary actuator arms apart which causes the primary axle and scraper to rotate counter to the secondary axle and scraper, thereby urging the primary and secondary scrapers toward each other and against a portion of a conveyor belt.

U.S. Pat. No. 6,056,111 by Stoll et al. is for a "Blade holder for conveyor belt reversible scraper blade". A reversible belt scraper blade is supported on the support arms of a belt scraper by attachment fittings that permit the blade to be rotated, in place, while the weight of the blade is carried on the belt scraper arms.

U.S. Pat. No. 7,308,980 by Peterson et al. is for a "Method for Distributing a Conveyor Belt Cleaner". A method of distributing and assembling a conveyor belt cleaner comprises manufacturing a first key component at a first point of fabrication in a longer than needed standard length, obtaining a first common component at a second point of fabrication, cutting the first key component to a desired length, and assembling the first key component with the first common component at the second point of fabrication. The method further comprises manufacturing a second key component at the first point of fabrication and assembling the second key component with the first common component at the second point of fabrication. In another aspect of the invention, the key components are manufactured into desired lengths and are sold as part of kit to be assembled to by the end user of the conveyor belt cleaner.

U.S. Published Application 2010/0126832 by DeVries is for a "Reinforced Cleaning Blade and Method of Manufacturing Thereof". A reinforced conveyor belt cleaning blade is provided. In one form, the reinforced cleaning blade includes a blade body and a metal insert that is of a substantially constant cross-sectional configuration extending between the ends thereof. The ends are surrounded by molded material of the blade body so that the blade body and insert have a secure connection therebetween. The preferred insert is a formed sheet metal member that has smooth surfaces extending along its length without projections or sharp corners. In another aspect, a method of manufacturing a conveyor belt cleaning blade is provided including placing a metallic insert for the cleaning blade in a mold and molding the body of the cleaning blade with polymeric material extending completely around ends of the insert. Preferably, the insert is magnetically held in position in the mold such as on a rail on which magnets are mounted.

U.S. Pat. No. 6,619,469 by Malmberg is for a scraper blade made of more than one material. The scraper blade has at one end a scraper tip and at the other end a mounting base. The scraper tip is outwardly tapered. The scraper blade has at least two layers of different materials. The layer of material which is facing forward, i.e. that first meets the surface to be scraped, and which is adapted to form the actual scraper tip is made of a material which is both softer and more abrasion resistant than said other layer.

U.S. Pat. No. 7,007,794 by Waters et al., is for a one-piece integral multi-durometer scraper blade for a conveyor belt cleaner. The scraper blade includes a body extending longitudinally between a first end and a second end and extending transversely between a base and a tip. The body includes a first body portion comprising a first elastomeric material having a first durometer of hardness, and a second body portion comprising a second elastomeric material having a second durometer of hardness. The body also includes a transition portion located between the first body portion and the second body portion.

U.S. Pat. No. 4,202,437 by Gordon is for a scraper assembly for a conveyor belt. A conveyor belt scraper assembly having a scraper core attached to a shaft which holds the scraper core in adjustable spatial relationship with the conveyor belt, the scraper core having slide-in mounting channels which hold resilient scraper blades in contact with the conveyor belt to remove foreign matter therefrom and to allow expeditious replacement of worn-out blades, the scraper core also being rotationally and linearly adjustable to permit compensation for a substantial range of wear on the blade edge surface.

SUMMARY OF THE INVENTION

Embodiments of the reversible belt scraper apparatus with replaceable blades run the width of the belt. The reversible apparatus has a central shaft with mounts at each end that facilitate mounting the reversible belt scraper blade and also the reversal of the apparatus to bring the other replaceable blade in contact with the belt. The replaceable belt scraper blade is comprised of an elastomeric body with mounts along a base. These mounts attach to the reversible shaft of the reversible belt scraper apparatus and allow a belt scraper blade that runs the length of the belt to be mounted to the reversible shaft. In at least one embodiment of the reversible belt scraper apparatus, the base of the belt scraper blade has an alternating pattern that allows the base to mount to the reversible central shaft while accommodating an opposing belt scraper blade having the same base arrangement. This allows the mounts on the belt scraper blades to have the full depth of the central mounting shaft without conflicting with each other and allowing one blade to be changed at a time. Separation of the reversible belt scraper apparatus into a central reversible shaft and two replaceable scraper blades mounted opposed to each other reduces the maximum weight of the largest component in the system while maintaining the simplicity of a single scraper component extending the width of the belt.

DETAILED DESCRIPTION OF EMBODIMENTS

Figure 1:
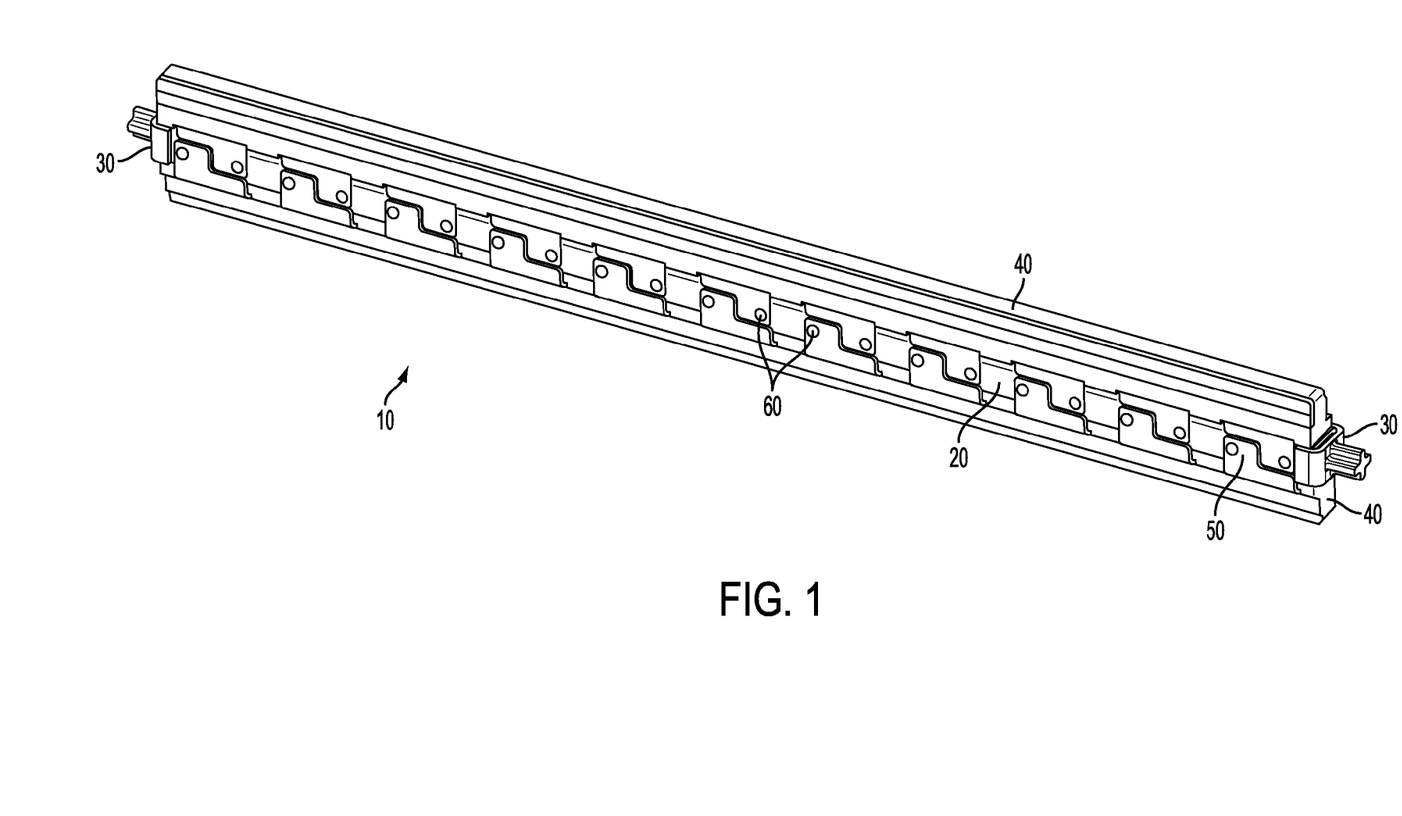
FIG. 1 is a perspective view of an embodiment of a reversible belt scraper with replaceable scraper blades.

Referring now to FIG. 1, an embodiment of the reversible belt scraper 10 of the present invention is shown. Reversible belt scraper 10 is generally made of a central shaft 20 having end mounts 30 at each end, and replaceable scraper blades 40. In the embodiment of reversible belt scraper 10 shown in FIG. 1, replaceable scraper blades 40 have multiple brackets 50 integrally molded into the base of scraper blades 40. Brackets 50 have tabs 51 with apertures for attaching replaceable scraper blades 40 to central shaft 20. In the embodiments of replaceable scraper blades 40 shown in FIG. 1, tabs 51 on brackets 50 are arranged to allow opposing replaceable scraper blades 40 to be attached along the same single line of apertures in central shaft 20.

Figure 2:
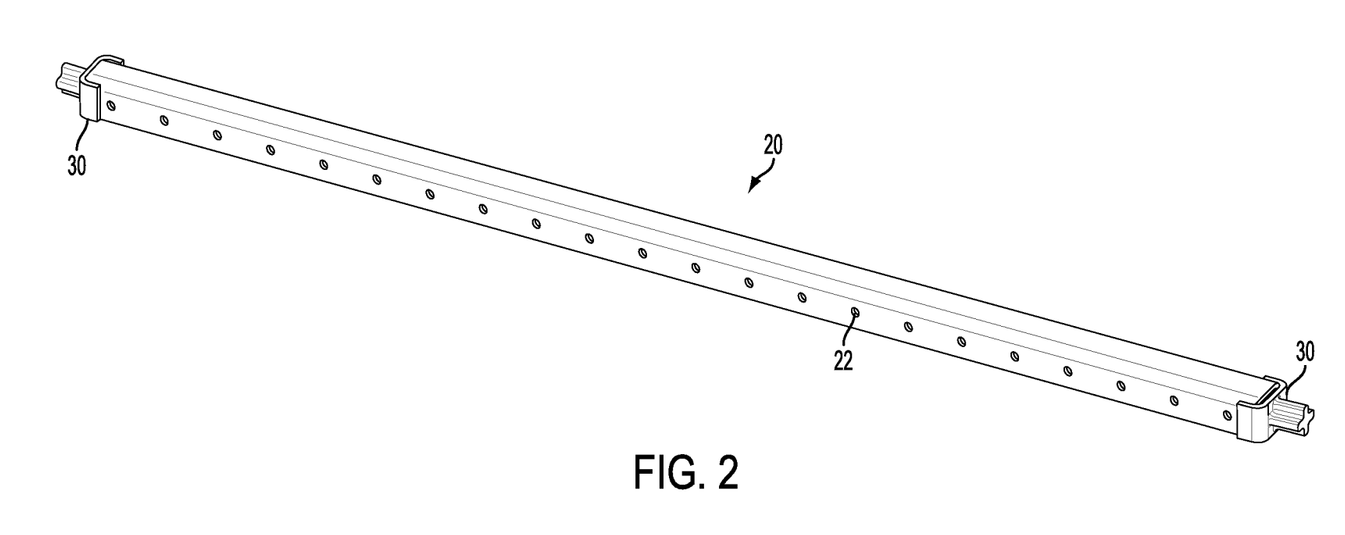
FIG. 2 is a perspective view of the central shaft of an embodiment of a reversible scraper.

Referring now to FIG. 2, central shaft 20 of reversible belt scraper 10 is shown without any replaceable scraper blades 40 being attached, and therefore, central shaft 20 may be seen more clearly and fully. In the embodiment of central shaft 20 shown in FIG. 2, central shaft 20 has a rectangular cross section and has four sides. Two opposing sides of central shaft 20 have a single row of receiving, or shaft, apertures 22 along their length. Receiving apertures 22 are used to attach replaceable scraper blades 40 to central shaft 20 with, for example, bolts. Returning to FIG. 1, the heads of fasteners 60 may be seen running the length of the side of reversible belt scraper 10. Fasteners 60 may be bolts or pins depending on the application and embodiment of reversible belt scraper 10. Depending on the embodiment, fasteners 60 may be through bolts or pins passing entirely through slightly oversized receiving apertures 22 and reversible belt scraper 10, or receiving apertures 22 may be threaded to match the threads on fasteners 60 when they are bolts.

Figure 3:
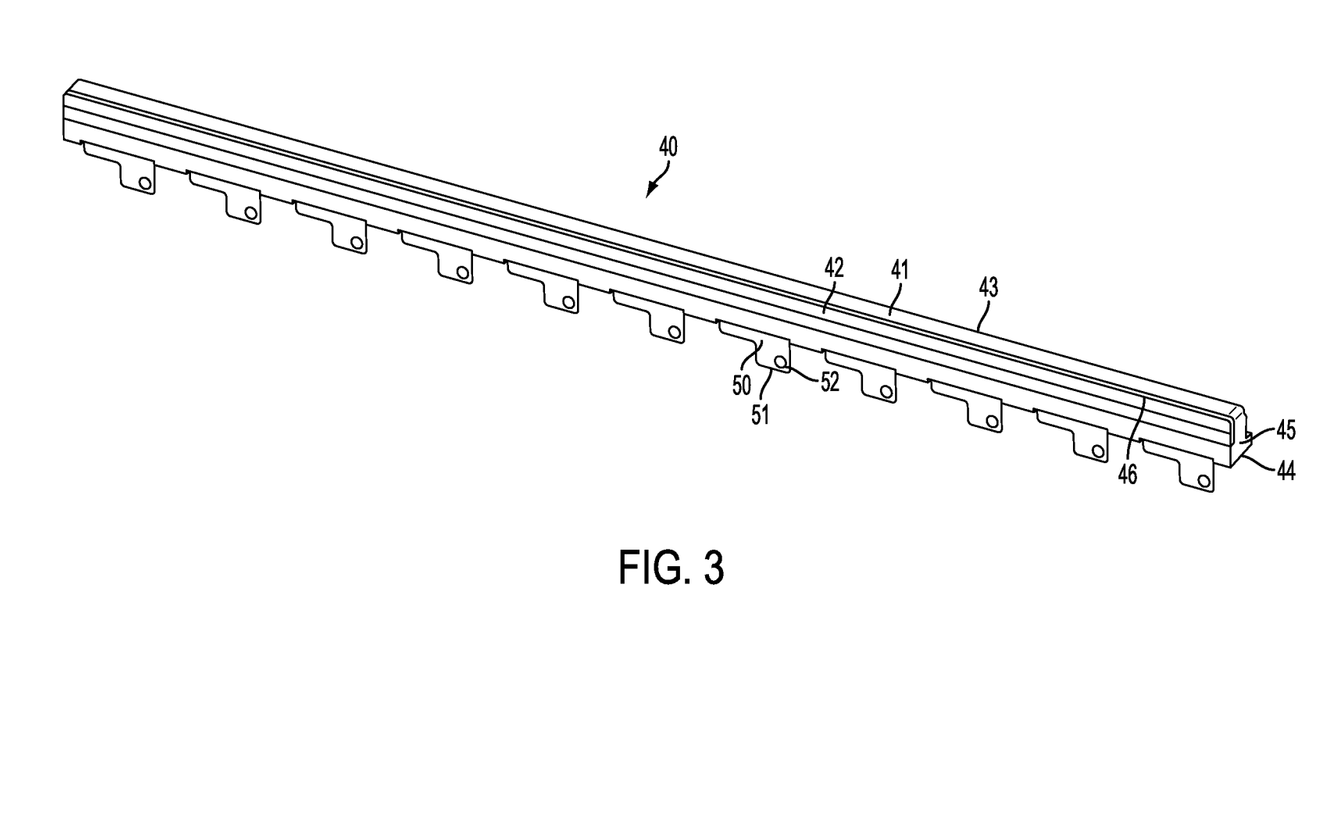
FIG. 3 is a perspective view of an embodiment of replaceable scraper blades for a reversible belt scrape.

Referring now to FIG. 3, an unattached replaceable scraper blade 40 is shown. Replaceable scraper blade 40 has a top scraping surface 41 having a leading edge 42 and a trailing edge 43. In the view presented in FIG. 3, leading edge 42 is on the front side of scraping surface 41, while trailing edge 43 is on the backside. Opposite to scraping surface 41 is base 44 with the body 45 of replaceable scraper blade 40 being generally disposed between. In the embodiment of FIG. 3, body 45 of replaceable scraper blade 40 is wider at the base 44 with the surface of body 45 beneath leading edge 42 being flat while the surface of body 45 beneath trailing edge 43 slopes backward to create a wider base. This produces a buttressing effect from the base up to leading edge 42.

In the embodiment of replaceable scraper blade 40 shown in FIG. 3, an insert 46 may be seen running the length of leading edge 42 of scraping surface 41 and extending down toward base 44. Insert 46 provides a leading edge 42 with greater resistance to wear. Other embodiments of replaceable scraper blade 40 may not have insert 46. Many embodiments of replaceable scraper blade 40 are made from elastomeric materials to allow scraping surface 41 to continually conform to a passing belt while maintaining contact pressure on the belt to remove excess material. As replaceable scraper blade 40 wears, contact surface 41 moves progressively down into body 45 of reversible scraper blade 40 while insert 46 wears as well and recedes apace with contact surface 41. Insert 46 may be made of any material having the desired wear characteristics. These materials may include other elastomers, metals, etc.

Still referring to FIG. 3, along the length of base 44 are located several separate brackets 50 integrally molded into base 44 of replaceable scraper blade 40. Brackets 50 have tabs 51 which descend from the base 44 of replaceable scraper blade 40. Tabs 51 have mounting, or tab, apertures 52, through them. As seen in FIG. 1 fasteners 60 pass through mounting apertures 52 to mount replaceable scraper blade 40 to central shaft 20 of reversible belt scraper 10.

Figure 4:
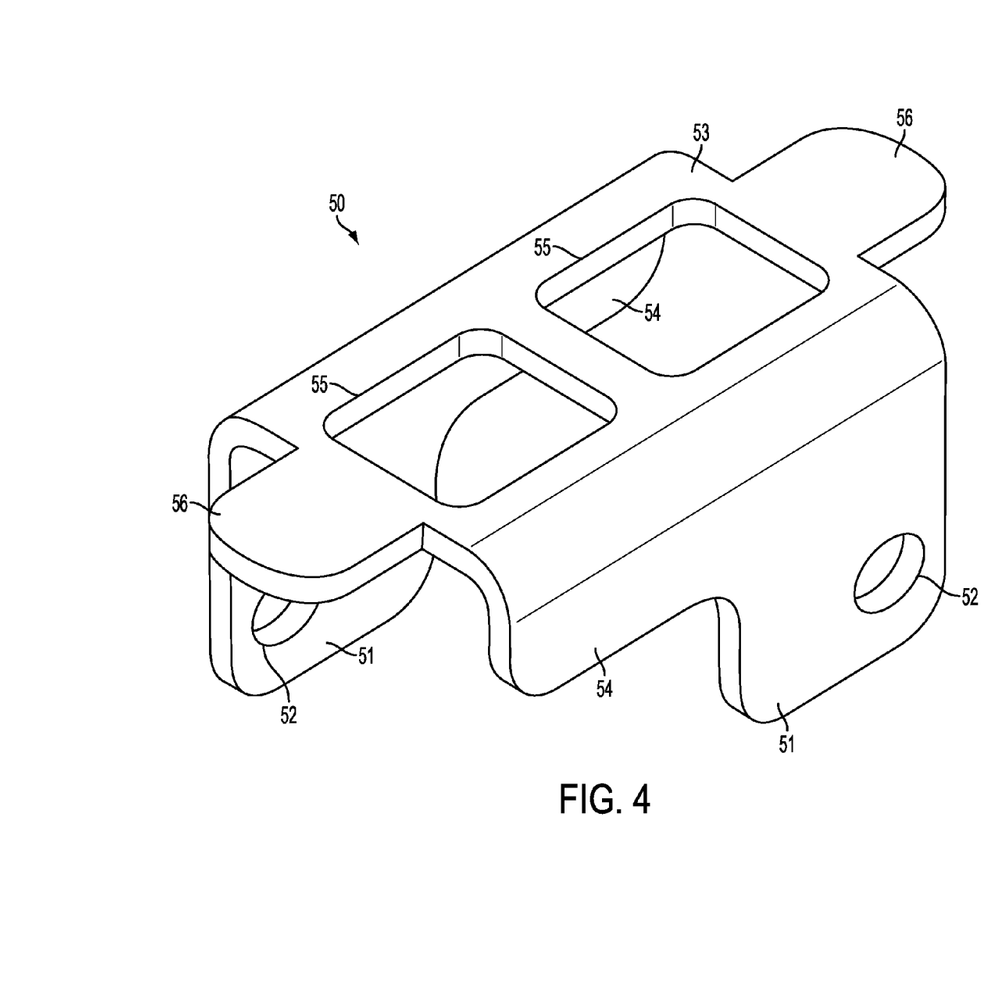
FIG. 4 is a perspective view of mounting bracket of an embodiment of a reversible scraper.

FIG. 4 shows an embodiment of bracket 50 not embedded in a replaceable scraper blade. Bracket 50 has a central panel 53 with two flanges 54 extending from opposite sides and turned downward. Tabs 51 are extensions of flanges 54, and as discussed before, have mounting apertures 52 through them. Central panel 53 has joining apertures 55 in it. Joining apertures 55 provide improved joining between bracket 50 and base 44 of body 45 of replaceable scraper blade 40 by allowing the elastomer from which the bulk of replaceable scraper blade is formed to flow through joining apertures 55 and around central panel 53 of bracket 50 during forming of replaceable scraper blade 40. Joining apertures 55 can also reduce the amount of material in bracket 50 by a sizeable percent thereby reducing the weight contributed by each bracket 50 to the total weight of replaceable scraper blade 40. Bracket 50 also has joining tabs 56 extending from central panel 53. In assembly, joining tabs 56 extend out into the elastomeric material of base 44 of replaceable scraper blade 40 to provide greater rigidity to the assembly. In the embodiment shown in FIG. 4, joining tabs 56 are reduced in width from that of central panel 53. By using separate and discrete smaller brackets, rather than a single long bracket, the weight of replaceable scraper blade 40 may be reduced as well as reducing the tooling cost that would be required for tools capable of producing a single long bracket. Rather, much smaller tooling can produce multiple small brackets 50 which combine to function as a single bracket when joined into replaceable scraper blade 40. Central shaft 20 adds further stiffness to replaceable scraper blade 40 when replaceable scraper blade 40 is mounted to central shaft 20. Gaps left between brackets 50 in replaceable scraper blade 40 are the equivalent of removed material in a single large bracket and contribute to reduced weight in a single long replaceable scraper blade such as the various embodiments of replaceable scraper blade 40. Additionally, in some applications, the small gaps between joining tabs 56 of brackets 50 allows replaceable scraper blade 40 to be easily cut to a custom length. When it is desirable to keep a simplified inventory, a single scraper length may be maintained on hand but cut down to fit several different standard belt widths. Alternatively, if a scraper blade for a narrower belt was erroneously allowed to go out of stock, maintenance personnel can cut down a large scraper blade easier than if a single metal bracket ran the length of the scraper blade.

In the embodiment of bracket 50 shown in FIG. 4, two tabs 51 extend from flanges 54 on opposite sides of bracket 50 and at diagonal corners. When this embodiment of bracket 50 is assembled into replaceable scraper blade 40, this produces a replaceable scraper blade 40 which can accommodate a complimentary opposing replaceable scraper blade 40 mounted along the same line of receiving apertures in a central shaft. Referring to FIG. 1 where two opposing replaceable scraper blades 40 are mounted on central shaft 20, it can be seen that tabs 51 of opposing replaceable scraper blades 40 alternate down the length of reversible belt scraper 10. This embodiment of bracket 50 allows a single type of replaceable scraper blade 40 to be used on a reversible belt scraper 10 while maintaining a lower profile with the use of a central shaft 20 accommodating only one row of receiving apertures 22.

Figure 5:
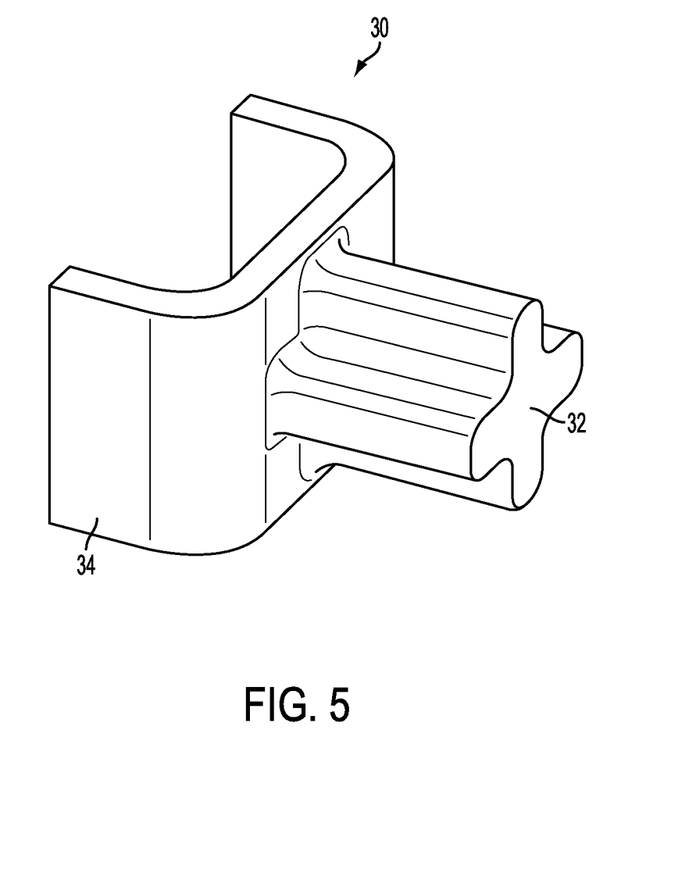
FIG. 5 is a perspective view of an end mount for a central shaft of a reversible belt scraper.

FIG. 5 is a perspective view of an embodiment of an end mount 30. End mount 30 may also be seen in FIGS. 1 and 2. Prominent features of end mount 30 are cruciform stud 32 and flanges 34. Flanges 34 of end mount 30 are welded to central shaft 20 of reversible belt scraper 10. However, other methods of joining end mount 30 to central shaft 20 could be used. Cruciform studs 32 of end mounts 30 provide a positive mount for reversible belt scraper 10. Cruciform studs 32 provide a quick and easy orientation of reversible belt scraper 10 so that reversible belt scraper 10 is positively located in its holder. Reversible belt scraper 10 may be reoriented by 180 degrees by rotating reversible belt scraper 10 about the axis represented by cruciform studs 32 to present a new scraping surface 41 to the belt. This is a much less cumbersome process than flipping the reversible belt scraper 10 about its long dimension.

Figure 6:
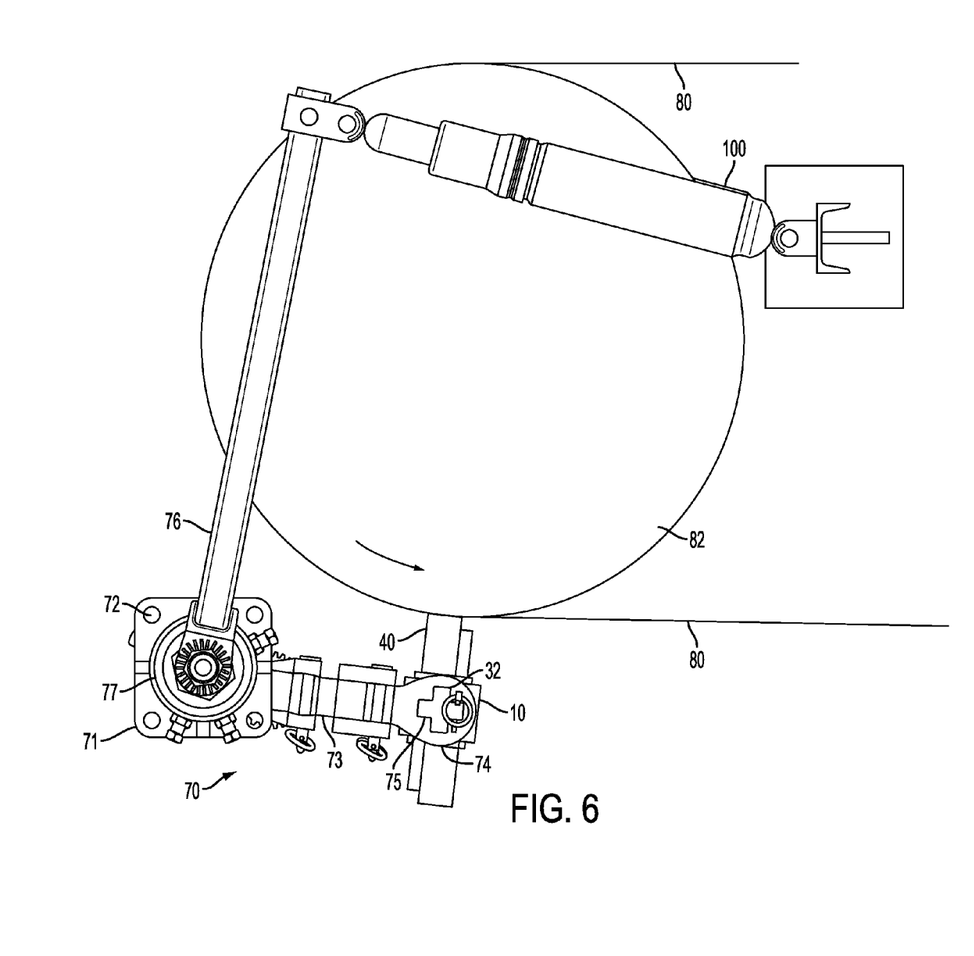
FIG. 6 is a side view of an embodiment of belt scraper apparatus holding a blade of a reversible belt scraper in contact with a moving belt.

FIG. 6 is a side view of an embodiment of a belt scraper apparatus 70 holding a blade 40 of a reversible belt scraper 10 in contact with a moving belt 80 to remove residual material. A matching mechanism to that seen in FIG. 6 is located on the other side of belt 80 and completes belt scraper apparatus 70 which supports both ends of reversible belt scraper 10. Reversible belt scraper 10 is mounted by cruciform mounting studs 32 of end mounts 30. Belt scraper apparatus 70 is mounted to supporting structure such as walls that may be enclosing belt 80 and pulley 82. Mounting flange 71 of belt scraper apparatus 70 is attached to the support structure by bolts through bolt holes 72 in flange 71. A mechanism (actuator) 71 extends through mounting flange 71 to the inside of the support structure. From that mechanism, scraper support arms 73 extend and terminate in scraper brackets 74 which have cruciform openings 75 to receive the cruciform studs 32 of end mounts 30. Cylinders 100 load tension arms 76 which turn the shaft on which support arms 73 are mounted and brings reversible belt scraper 10 in contact with belt 80.

While specific embodiments of reversible belt scraper 10 have been discussed, these embodiments should not be taken as exhaustive of possible embodiments which would still be within the scopes and claims of this invention. For example, while replaceable scraper blade 40 are described as having brackets 50 with diagonally located mounting apertures 52 along the length of its base, replaceable scraper blade 40 may only have brackets 50 at each end and then alternating solid brackets along its base. This is another embodiment that would allow replaceable scraper blade 40 to accommodate an opposing replaceable scraper blade. Likewise, end mounts 30 are shown with a specific configuration, but would not necessarily have to have a cruciform stud in every case. For example, a square stud, or even a flat elongated stud, may suffice depending on the holder. In some embodiments, end mounts 30 may consist only of flanges 34 wrapped around central shaft 20 with no protruding studs at all. Some embodiments of replaceable scraper blade 40 may not have insert 46 or insert 46 may be made of different materials or have different shapes. The abstract is intended only as a brief overview of the specification and is not intended to define the invention claimed. The drawings are not exhaustive depictions of the numerous embodiments encompassed by the present invention.

We claim:

1. A reversible belt scraper comprising:
   a central shaft having two ends and a pair of opposing sides extending along its length and terminating at each said end;
      each said end having a mount for mounting said belt scraper;
      each said side having a series of shaft apertures spaced along its length;
   a pair of replaceable scraper blades approximately the length of said opposing sides, said scraper blades mounted diametrically opposite to each other on said central shaft, each said scraper blade comprising;
      an elastomeric body having a scraping face and a base opposite said scraping face, and
         at least one bracket molded into said base of said elastomeric body, said at least one bracket having two rows of tabs along the length of said elastomeric body, said tabs extending away from said elastomeric body in a direction opposite to said scraping face, said rows being spaced wide enough apart to fit outside said opposing sides of said central shaft, each said tab having a tab aperture located to match the position of a shaft aperture; and,
   a fastener inserted through each tab aperture overlaid over a shaft aperture.

2. The reversible belt scraper of claim 1, wherein:
   said shaft apertures are spaced along a straight line along the length of each said said opposing side, and
   said tabs are spaced sufficiently apart in said rows to allow said tabs from opposing scraper blades to insert between each other while said scraper blades are on said central shaft and said tab apertures overlay shaft apertures.

3. The reversible belt scraper of claim 2, wherein:
   the tabs in one row on a scraper blade are matched by spaces in the other row on that same scraper blade, said space being large enough to fit a tab.

4. The reversible belt scraper of claim 1, wherein:
   said at least one bracket comprises a plurality of brackets, each said bracket having at least one said tab.

5. The reversible belt scraper of claim 4, wherein:
   each said bracket comprises at least two of said tabs and a webbing connecting said tabs, said webbing being molded into the base of said scraper blade.

6. The reversible belt scraper of claim 5, wherein:
   said tabs are opposed by a space which is the width of a tab.

7. The reversible belt scraper of claim 5, wherein:
   said webbing has at least one aperture through it.

8. The reversible belt scraper of claim 1, wherein:
   said mounts comprise a cruciform stud for mounting said reversible belt scraper.

9. The reversible belt scraper of claim 1, wherein:
   at least one of said replaceable scraper blades further comprises an insert in said elastomeric body, said insert running along the length of said scraping face.

10. A replaceable scraper blade for a belt scraper, said scraper blade comprising:
    an elastomeric body having a scraping face and a base opposite said scraping face, and
    at least one bracket molded into said base of said elastomeric body, said at least one bracket having two rows of tabs along the length of said elastomeric body, said tabs extending away from said elastomeric body in a direction opposite to said scraping face, said rows being spaced wide enough apart to fit around a shaft for mounting said scraper blade, each said tab having an aperture through it, and
    each said tab in one row is matched by a space in the other row, said space being large enough to accommodate a tab.

11. The replaceable scraper blade of claim 10, wherein:
    said at least one bracket comprises a plurality of brackets, each said bracket having at least one said tab.

12. The replaceable scraper blade of claim 11, wherein:
    each said bracket comprises at least two of said tabs and a webbing connecting said tabs, said webbing being molded into the base of said scraper blade.

13. A bracket for molding into the base of a replaceable scraper blade, said bracket comprising:
    a generally flat webbing having a first edge and a second edge opposite of each other;
    a first tab extending generally perpendicular from said first edge, said first tab having an aperture through it,
    a second tab extending generally perpendicular from said second edge in the same direction as said first tab, said second tab having an aperture through it,
    wherein, said first edge and said second edge are each at least as long as the combined width of said first tab and said second tab, both said first tab and said second tab being opposed by a space at least as wide as itself on the opposing edge.

14. The bracket of claim 13, further comprising:
    at least one aperture through said webbing.

15. The reversible belt scraper of claim 5, wherein:
    said at least one bracket of each said scraper blade further comprises at least one joining tab extending from said webbing into said elastomeric body of a respective one of said scraper blades.

16. The replaceable scraper blade of claim 12, wherein:
each said bracket further comprises at least one joining tab extending from said webbing into said elastomeric body.

17. The bracket of claim 14, further comprising:
a pair of joining tabs, each of said joining tabs extending from said webbing.

\* \* \* \* \*